April 30, 1968 R. ZULEEG 3,381,187

HIGH-FREQUENCY FIELD-EFFECT TRIODE DEVICE

Filed Aug. 18, 1964 2 Sheets-Sheet 1

INVENTOR.
RAINER ZULEEG,
BY
W. H. MacAllister Jr.
ATTORNEY.

HIGH-FREQUENCY FIELD-EFFECT TRIODE DEVICE

Filed Aug. 18, 1964 2 Sheets-Sheet 2

INVENTOR.
RAINER ZULEEG,
BY
W. H. MacAllister Jr.
ATTORNEY.

Patented Apr. 30, 1968

3,381,187
HIGH-FREQUENCY FIELD-EFFECT TRIODE DEVICE

Rainer Zuleeg, Newport Beach, Calif., assignor to Hughes Aircraft Company, Culver City, Calif., a corporation of Delaware
Filed Aug. 18, 1964, Ser. No. 390,379
10 Claims. (Cl. 317—235)

This invention relates to novel high-frequency solid-state electronic devices and to methods for fabricating such devices. More particularly, the invention relates to field-effect solid-state active devices such as rectifiers and amplifiers. As used herein the term "active device" means any solid-state electronic device which can alter one or more characteristics of an electrical signal applied thereto in a controllable and reproducible fashion in contrast to a "passive device" which does not controllably alter the characteristics of an electrical signal applied thereto or transmitted thereby.

Active field-effect semiconductor devices, sometimes called "unipolar" or "analog" transistors, are known. A thin-film form of such a transistor is described in my co-pending application, S.N. 634,395 which is a continuation of S.N. 258,081, now abandoned, filed Feb. 12, 1963, and assigned to the instant assignee. Unipolar or analog transistors have also been described by W. Shockley in an article entitled "Transistor Electronics: Imperfections, Unipolar and Analog Transistors" published in the November 1952 Proceedings of the I.R.E. (vol. 40, No. 11) at page 1289 and especially at page 1311. Because of both the techniques for forming such devices and because of their extremely small dimensions, the fabrication of complete solid-state circuits, including passive as well as active functions, has become of increasing importance and has given rise to a whole new art called variously, solid circuitry, micro-circuitry, integrated circuitry, or microelectronics. Such circuitry is possible because of the ability to form thin films by vapor-deposition, masking, and solid-state diffusion techniques which films are capable of controllably providing such functions as rectification, amplification, resistance, capacitance, and inductance, in a single integrated structure. Thus, amplification can be provided by vapor-depositing a metallic electrode, which may be called a "source," upon a substrate and then depositing a layer of a semi-insulator material upon the "source" electrode. A "drain" or collector electrode is then formed by depositing a thin metallic film on the semi-insulator body. Likewise by masking and vapor-deposition techniques an additional metallic "gate" or control electrode in the form of a grid, for example, may be disposed in the semi-insulator body between the source and drain electrode films. Thus the flow of majority charge carriers from the source to the drain electrode through the semi-insulator body may be controlled by the field therein established by a signal on the gate electrode. Such devices are closely analogous to vacuum tubes devices (hence the term "analog" transistors) except that in these field-effect devices the charge carriers flow from cathode (source) to anode (drain) in a solid medium generally called a semi-insulator. In order to provide a convenient distinction between semiconductor transistors utilizing rectifying junctions or point contacts to achieve rectification or amplification, the unipolar transistor devices to which the present invention relates is referred to herein as a field-effect triode device. In comparison with semiconductor devices of the junction type in which charge carriers already available in the semiconductor body are injected across a junction between regions of opposite conductivity, the charge carriers in the field-effect triode device of the present invention are normally not available in the body of semi-insulator and are injected thereinto by and from the aforementioned source electrode.

In the co-pending application of R. Zuleeg, S.N. 633,638 which is a continuation of S.N. 333,127, now abandoned, filed Dec. 24, 1963, and assigned to the instant assignee, such a field-effect triode device is described which comprises a grid of N-type material, for example, embedded in a body of P-type silicon which grid serves as the "gate" electrode between the "source" and "drain" electrodes which, in one embodiment, are constituted by metallic films disposed on opposite surfaces of the silicon body. In this device the current flowing from the source electrode to the drain electrode through the body of semi-insulator material is controlled by impressing an appropriate signal on the N-type grid gate. This signal establishes an electric field around the grid so as to effectively suppress or close-off the flow of majority charge carriers through the interstices of the grid from the source to the drain electrodes.

It will be appreciated that maximum usefulness and effectiveness of such a device is achieved only by confining the current flowing from the source to the drain to the channel or channels of the grid which are controlled by the electric field established thereon by the grid signal. In integrated circuitry, where such a device may be disposed on a fairly extensive semi-insulator body, such confinement may be a difficult achievement since the source-drain current may continue to flow around the grid and not through it.

In the co-pending application (S.N. 390,292) filed concurrently herewith by R. Zuleeg and V. O. Hinkle, Jr., and assigned to the instant assignee, a field-effect triode is described having means for confining current flow through the gate electrode thereof. Briefly, the triode device described in that application includes a current channel-confining "guard-ring" electrode in the body of semi-insulator material which extends into the semi-insulator body so as to surround and electrically contact the grid gate electrode. This "guard-ring" is formed of semi-insulator material of opposite conductivity-type to that of the semi-insulator body itself. Current flowing in the semi-insulator body is confined by this guard-ring to the channels of the grid gate thus providing more effective control or "pinch-off" thereof by the grid gate.

Since, in such a triode device, the guard-ring provides a P-N junction and is, electrically, a part of the grid electrode, a passive capacitance is added to the input or gate terminal when under bias. While such capacitance is of negligible consequence for low frequency operation of the field-effect triode device, it becomes a limiting factor in high-frequency applications thereof.

It is, therefore, an object of the present invention to provide an improved field-effect solid-state electrical device.

Another object of the invention is to provide an improved high-frequency field-effect triode device.

Another object of the invention is to provide an improved high-frequency field-effect triode device having a grid gate electrode and means for confining current flow through the gate electrode.

Yet another object of the invention is to provide an improved high-frequency field-effect triode device for use in microelectronic integrated circuitry which can be fabricated as an integral part of such circuitry, and which device has means for isolating its current flow between its input and output electrodes.

These and other objects and advantages of the invention are attained by providing a current channel-confining "guard" electrode or "ring" in a body of semi-insulator material and laterally around the grid gate electrode in a field-effect triode device. This guard-ring is formed of semi-insulator material of opposite conductivity-type to that of the semi-insulator body itself. In a typical embodiment, N-type semi-insulator material may be disposed between a pair of electrically conductive members constituting the source and drain electrodes of the device. A P-type grid of semi-insulator material is embedded in the semi-insulator body between the source and drain electrodes. A ring of P-type semi-insulator material is formed in the N-type semi-insulator body and extends from a surface thereof down into the body so as to literally wall-in or surround but not contact the P-type grid. By this guard-ring, current flowing in the field-effect triode device is confined to the channels of the grid thus providing more effective control or "pinch-off" thereof by the grid gate as well as higher transconductance. By not electrically connecting the guard-ring to the triode device and especially not to the grid electrode, the guard-ring is left "floating" and a separate electrical connection is made to the gate electrode which greatly reduces the gate capacitance without sacrificing transconductance and breakdown.

The invention will be described in greater detail by reference to the drawings in which.

In connection with the field-effect triode devices according to the present invention, the term "semi-insulator" refers to and means any material which at room temperature has a low intrinsic majority carrier concentration so that at room temperature the material exhibits low electrical conductivity. In general, any material which exhibits an energy gap of at least about 1.0 e.v. is satisfactory for the semi-insulator element in the devices of the present invention. Suitable materials are silicon and compounds of the elements from the Third with elements from the Fifth Columns of the Periodic Table of the Elements such as: aluminum phosphide, aluminum arsenide, aluminum antimonide, gallium phosphide, gallium arsenide, indium phosphide, also satisfactory are compounds of the elements from the Second Column with elements from the Sixth Column of the Periodic Table of the Elements such as: zinc sulfide, zinc selenide, zinc telluride, cadmium sulfide, and cadmium selenide, cadmium telluride and mercury sulfide. Silicon carbide is also a suitable semi-insulator material for the purposes of the present invention. While any of the aforementioned materials may be used to advantage in the practice of the invention, description herein will be confined primarily to the use of silicon as an exemplary material.

Figure 1:
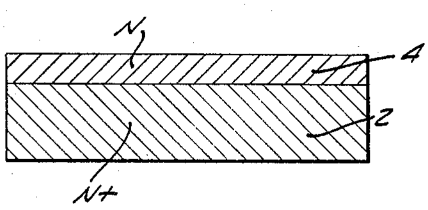
FIGURE 1 is a cross-sectional elevational view of a field-effect triode device according to the invention in an initial stage of fabrication thereof.

As shown in FIGURE 1, a substrate member 2 of high conducitivity N-type silicon, for example, is provided for supporting the field-effect triode device to be fabricated. Although such a device may comprise a body of semi-insulator material sandwiched between metallic layers which may serve as source and drain electrodes, it is not essential that these electrodes be metallic. As taught in the aforementioned copending application of R. Zuleeg (S.N. 333,127 filed Dec. 24, 1963), the source and/or drain electrodes may be formed of highly conductive semi-insulator material.

Because of the great difficulty in vapor-depositing silicon upon substrate surfaces of materials other than silicon itself, the fabrication of a field-effect triode device utilizing silicon as the semi-insulator material is facilitated by the employment of a substrate of silicon which, according to the embodiment shown may also conveniently serve as the source electrode. Thus, silicon may be conveniently deposited upon silicon, making it feasible to form at least the lower or source electrode and substrate of silicon which has been heavily-doped so as to be an effective electrical conductor. It is known that by heavy doping of a semi-insulator body, such body can be converted to degenerative semi-insulator material which means that the body has such a concentration of impurity therein as to cause it to lose its semi-insulator characteristics and to behave as a more conventional electrical conductor. The silicon semi-insulator material constituting the device body proper may then be deposited upon the degeneratively-doped silicon.

To achieve the arrangement shown in FIGURE 1 several methods of fabrication are available. A body of semi-insulator material having the resistivity desired for the field-effect device may be initially provided. By diffusion one portion of the body may be doped to degeneracy to thus form a source electrode member and substrate 2 while leaving the opposite surface portion unchanged in resistivity so as to constitute a first device body portion 4 as shown. Alternatively, a substrate and source electrode member 2 of high conductivity semi-insulator material may be initially provided and, as will be described in greater detail hereinafter, by an epitaxial process the first device body portion 4 may be formed on the substrate-electrode 2.

For convenience, and solely for purposes of illustration, the device semi-insulator body in this embodiment of the invention may be referred to as being of N-type conductivity due to an excess of majority charge carriers (i.e., electrons) therein. The grid gate electrode member 6 may be referred to as being of P-type conductivity due to a deficiency of majority charge carriers (i.e., electrons) therein. It will be understood that such conductivity conditions are usually established by the incorporation of certain impurity elements into the bulk semi-insulator material. Thus silicon, for example, may have any one of such impurity elements as arsenic, antimony, or phosphorous incorporated therein to establish N-type conductivity since these elements contribute an excess of electrons to the silicon for current conduction. P-type silicon may have any one of such impurity elements as aluminum, boron or indium incorporated therein to establish P-type conductivity since these elements lack an excess of electrons for current conduction. The process of incorporating such impurity elements into the crystal lattice structure of semiconductor materials is well known and is commonly referred to as "doping" and may be achieved by diffusing or alloying the impurity into the semi-conductor body or by including such impurity in the melt from which the semiconductor crystal body is grown.

According to the invention, the gate electrode member 6 may be of semi-insulator material and, as has been mentioned previously, of the same material as the semi-insulator body 4 although of different conductivity type. Thus, if as described the semi-insulator body 4 is of N-type conductivity, the gate electrode member 6 may be of P-type conductivity.

Figure 2:
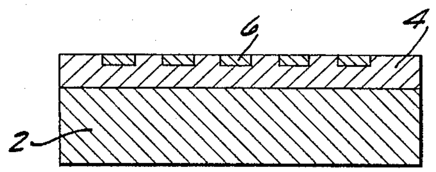
FIGURE 2 is a cross-sectional elevational view of the field-effect triode device shown in FIGURE 1 at a subsequent stage in the fabrication thereof.
Figure 3:
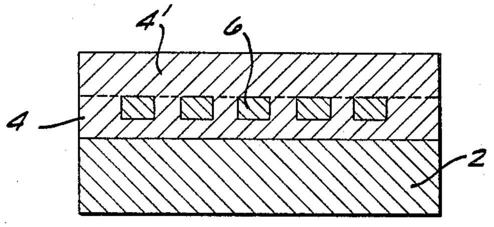
FIGURE 3 is a plan view of the field-effect triode device shown in FIGURE 2.

Referring now to the drawings, the fabrication of a field-effect triode device according to the invention having a grid gate electrode 6 may be achieved by diffusing an acceptor conductivity-type-detemining impurity through a suitable mask upon the surface of the N-type layer 4. The mask may be formed by oxidizing the surface of the silicon layer 4 then removing portions of the oxide corresponding to the dimensions and pattern of the grid to be formed. The formation of such an oxide mask may be achieved by photo-resist and etching techniques as is well known in the art. Diffusion of the acceptor impurity is then achieved so as to form a grid 6 of P-type silicon material in the N-type silicon layer 4. Thereafter the oxide mask is entirely removed leaving the structure shown in FIGURES 2 and 3. These oxide masking and diffusion techniques are well known in the art and reference is made to U.S. Patents Nos. 2,802,760 to Derick & Frosch and 3,025,589 to Hoerni for a complete detailed description thereof.

Figure 4:
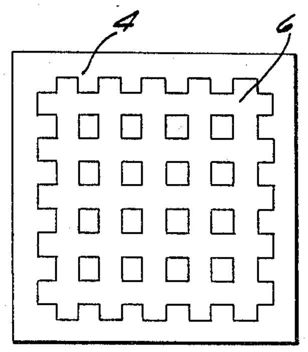
FIGURE 4 is a cross-sectional elevational view of the field-effect triode device shown in FIGURES 2 and 3 at a further subsequent stage in the fabrication thereof.

A layer 4' of N-type silicon may then be epitaxially deposited upon the P-type grid 6 and the exposed portions of the N-type layer 4 as shown in FIGURE 4. In this process the silicon may be formed by the epitaxial process and caused to deposit upon the N-type layer 4 by the simultaneous reduction in hydrogen of phosphorous trichloride and silicon tetrachloride at a temperature of from 1200 to 1300° C. The epitaxial process is well known and fully described by H. C. Theuerer in the Journal of the Electrochemical Society (1961, vol. 108 at page 649) and by A. Mark in the same Journal (1961, vol. 108 at page 880).

Figure 5:
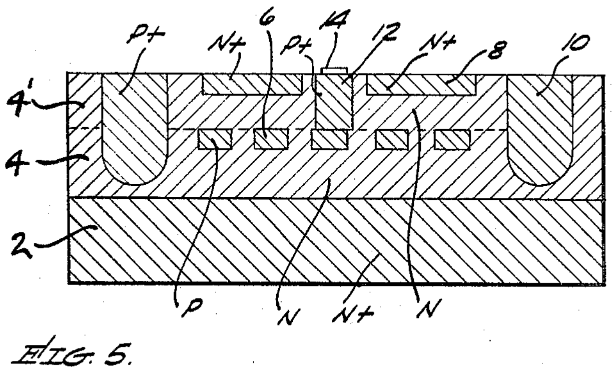
FIGURE 5 is a cross-sectional elevational view of a field-effect triode device according to the invention.
Figure 6:
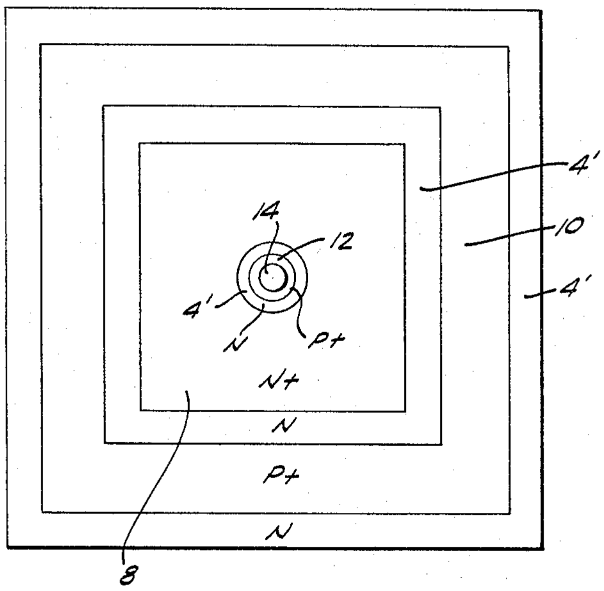
FIGURE 6 is a plan view in section of the field-effect triode device shown in FIGURE 5.

Thereafter and with special reference to FIGURES 5 and 6, the upper surface of the N-type layer 4' may be masked as by oxidizing this surface and then removing a loop or ring of the oxide of a diameter sufficient to encompass or surround the underlying gate electrode 6. At the same time a centrally disposed opening in the oxide mask may also be provided which opening is positioned above the underlying grid gate electrode 6.

The assembly is then exposed to an atmosphere containing the vapors of a P-type conductivity-type-determining impurity, such as boron, for example, which impurity, by the process of diffusion into the exposed N-type silicon surface through the annular and the central openings in the oxide mask, converts an annular portion 10 and a central portion 12 of surface and near-surface regions of the exposed silicon to P-type conductivity. Thus, a P-type guard-ring 10 and a P-type contact region 12 are formed, the guard-ring 10 extending down into the semi-insulator body so as to surround the grid gate electrode 6 while the contact region 12 extends down into the semi-insulator body so as to electrically contact the gate electrode 6. Thereafter, the upper surface of the semi-insulator body may be closed or sealed-off to the atmosphere by re-oxidizing the exposed portions of the semi-insulator body.

The drain electrode layer or member 8 may then be formed by removing a portion of the oxide mask and diffusing into the exposed portion of the N-type layer 4' a donor impurity such as arsenic thus forming the layer 8 of high conductivity material therein which surrounds the gate contact region 12 but which is electrically separated therefrom by the intervening portions of the N-type semi-insulator body as shown in FIGURES 5 and 6.

After the drain diffusion step has been completed, portions of the remaining oxide film may be removed as by etching the same with hydrafluoric acid so as to provide exposed areas of the drain electrode layer 8 and the gate contact region 12 which areas permit electrical connections to be made thereto.

The complete device is shown in FIGURE 5 and includes: (1) a drain electrode member 8 comprising a layer of high conductivity N-type silicon; (2) a source electrode member 2 comprising also a layer of high conductivity N-type silicon; (3) a semi-insulator body 4, 4' of lower conductivity N-type silicon in which is embedded (4) a P-type grid gate electrode member 6 surrounded by a high conducitvity P-type channel-confining wall or ring 10; and (5) a high conductivity P-type region 12 electrically contacting the P-type grid gate 6 and having a metallic contact member 14 which may be of aluminum, for example. In this device the current flowing from the electrode layer 2 to the electrode layer 8 through the N-type silicon material 4 and 4' may be controlled by impressing any desired signal through the gate contact region 12 on the P-type grid 6. An appropriate voltage signal on the grid 6 will establish a space-charge region around the N-type openings or channel portions of the grid, the width of which space-charge region or regions is variable and controllable in accordance with the grid signal. Hence, the channels for the flow of majority charge carrier current through the grid are of variable and controllable cross-sectional area thus permitting one to effectively regulate and suppress or "pinch-off" the flow of such current as desired. The P-type wall or guard-ring 10 will confine the source-drain current to the portions of the semi-insulator body 4, 4' between the source and drain electrodes 2 and 8 thus subjecting substantially all of this source-drain flow to effective control by grid member 6.

The device of FIGURE 5 may also be provided in the reverse polarity, that is, the grid 6 may be composed of N-type material and the semi-insulator body 4, 4' of P-type material in which case the source and drain electrodes 2 and 8 would be composed of high conductivity P-type material, while the guard-ring 10 and the gate contact region 12 would be of high conductivity N-type material.

While the drain electrode 8 has been described as being formed by diffusion, this is not the only way in which this electrode may be fabricated. Alternatively, it is possible to deposit a predetermined quantity of gold and antimony (say 1% antimony) on the surface of the semi-insulator body and to heat the assembly for a short time (say one or two minutes) at a temperature of from 300–500° C. so as to alloy the gold-antimony to the silicon material thus forming the high conductivity drain electrode 8. In some instances this alloying technique may be preferred over diffusion because of the relatively short time required to form the alloy region in contrast to diffusion processes which often are long enough and of high enough temperatures to cause other regions of the device to undergo undesired further diffusion.

While a grid of rectilinear geometry has been shown, it is not necessary that the grid shape be so restricted. In some instances a grid formed so as to provide round or circular channels may be preferred since such round channeled grids are capable of pinching-off the current flow with only half of the voltage required for grids having a square channel configuration. The significance of the geometry or shape of the channels in the grid will be appreciated when it is understood that the pinch-off voltage is determined by the following expression for round channels:

$$V_{PO}=\frac{D^2}{16\epsilon\epsilon_0\mu\rho}$$

where D is the diameter of the channel, $\epsilon$ is the relative dielectric constant of the semi-insulator material in the channel, $\mu$ is the mobility of the charge carriers in the channel, $\rho$ is the resistivity of the semi-insulator material in the channel, and $\epsilon_0$ is the permittivity of vacuum.

In contrast, the pinch-off voltage ($V_{PO}$) for a square channel device is determined according to the following expression:

$$V_{PO}=\frac{D^2}{8\epsilon\epsilon_0\mu\rho}$$

As mentioned previously, the provision of a separate electrical connection to the grid gate electrode 6 while leaving the guard-ring 10 floating electrically, reduces the gate capacitance without sacrificing transconductance and breakdown. In contrast to the field-effect triode device described in the aforementioned co-pending application, S.N. 390,292 of R. Zuleeg and V. O. Hinkle, Jr. wherein the guard-ring member also serves to provide electrical connection to the gate electrode 6, the frequency response of instant triode device is much improved as will be appreciated from the following comparison. For a device in which the guard-ring member 10 contacts the grid gate electrode 6, the frequency figure of merit (F) is given as:

$$F=\frac{g_m}{2\pi C_{in}}\cong 260 \text{ mc.}$$

where $g_m$ is the transconductance and may be about 10 ma./v., and $C_{in}$ is the input capacitance and may be about 6 pf.

For the instant triode device wherein the guard-ring member 10 is left floating electrically, $C_{in}$ is reduced to about 2 pf. and the frequency figure of merit (F) is about 800 mc.

The structure shown in FIGURES 5 and 6 permit one to make electrical connections to the gate 6 and to the drain electrode 8 on the top surface of the field-effect device which is of extreme advantage in integrated circuitry. These electrical connections may be in the form of vapor-deposited metallic films in which case portions of the guard-ring region 10 will be left open or interrupted so as to permit the metallic connection layers to extend therethrough without making electrical contact therewith. If desired these deposited metallic layers may be insulated from any underlying electrode region except that to which it is desired to make the connection by an insulative layer of oxide, for example, of the semi-insulator material as is well known in the art. Alternatively, connections to the grid contact region 12 and the drain electrode region 8 may be made by directly securing wires to these regions by thermo-compression bonding techniques or by soldering or even pulse bonding.

Figure 7:
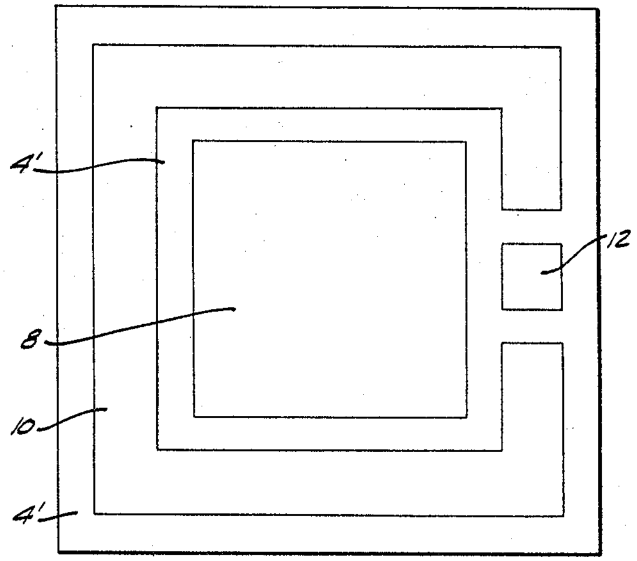
FIGURE 7 is a plan view in section of another embodiment of a field-effect triode device according to the invention.

In FIGURE 7 another embodiment of the high-frequency field-effect triode device of the invention is shown in which the contact region 12 to the gate electrode 6 is provided by interrupting the P-type guard-ring 10 and positioning the gate contact region 12 in the gap provided thereby. This embodiment has certain advantages in that it does eliminate the necessity for extending the connection to the gate contact region 12 or through the drain electrode member 8.

While fabrication of the gate contact region 12 has been described with respect to the diffusion process, this is not the only technique available for making this contact region. The gate region 12 may also be provided by alloying an opposite conductivity-type-determining impurity to the semi-insulator body 4' at an exposed top surface thereof after which a wire may be connected thereto as by pulse bonding, soldering or thermo-compression bonding techniques. It is also possible, providing the underlying grid electrode member 6 is not at too great a depth beneath the surface of the semi-insulator body, so as to achieve the contact region 12 thereto by pulse bonding utilizing impurity-doped or coated wire as described in U.S. Patent 2,792,538 to W. G. Pfann.

Figure 8:
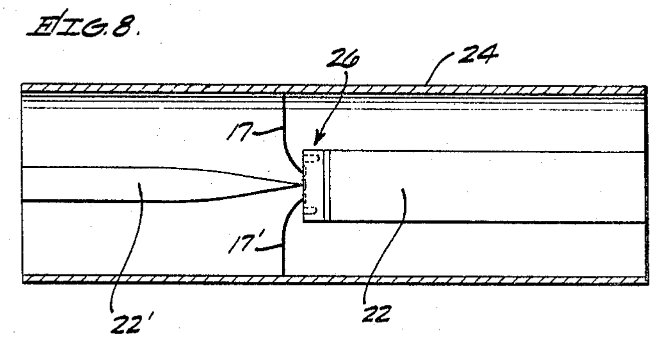
FIGURE 8 is a plan view partly in section showing a high-frequency application of the field-effect triode device according to the invention in a coaxial type transmission line.

In FIGURE 8 the application of a field-effect amplifier triode device 26 according to the present invention is shown coupled to a high-frequency coaxial type transmission with minimum loss. This embodiment demonstrates also the feasibility of operating the field-effect triode device in a reversible fashion which follows from the symmetrical nature of the electrode regions of the device. Thus, it will be understood that the "source" and "drain" electrodes may be electrically reversed in operation so that the electrode region 2, hereinafter called the "source," may be operated as the drain electrode, while the electrode region 8, hereinafter called the "drain," may be operated as the source electrode.

The triode device 26 in FIGURE 8 has a centrally-disposed gate contact region 12 as shown in FIGURES 5 and 6 and is mounted on one end of the inner conductor 22 of a coaxial transmission line having an outer conductor 24 by soldering. In this embodiment the triode device is so disposed and operated that the electrode region 2 which is mounted to the end of the inner conductor 22 functions as the drain electrode. Electrical connections to the source electrode 8 may be provided by wires 17 and 17' or by a diaphragm member which may be soldered by otherwise secured to the inner surface of the outer conductor 24 and extended in and bent down to contact the electrode 8. A diaphragm-like connection is preferred because it will shield the input section from the output section of the triode device. The signal input connection to the gate electrode is provided by means of the other inner conductor 22' of the coaxial transmission line. The gate connection 22' may be provided by tapering the end of the inner conductor to a fine point so as to bear against the gate contact region 12 which is centrally-disposed on the surface of the triode device as shown in FIGURES 5 and 6.

By electrically reversing the electrode regions 2 and 8 in this embodiment, whereby the electrode region 2 constitutes the drain electrode and the electrode region 8 constitutes the source electrode, two important advantages are achieved. First, the drain contact delivers the output signal to the transmission line at an appropriate load impedance. Secondly, the center conductor 22 of the transmission line serves as an excellent heat sink which improves the power dissipation of the triode device.

The multi-channel field-effect transistor device described herein has been found to have electrically unlimited power capabilities for a given geometric design which in practice is curtailed only by mechanical design considerations relating to the encapsulation necessary to provide the required thermal resistance paths. Calculations show that for a given geometry the maximum frequency of oscillation for the field-effect transistor device of the invention is given by:

$$f_{max}=\frac{g_m}{2\pi C_{GD}}=\frac{1}{2\pi C_{GD}R_0} \quad (1)$$

where $g_m$ is the transconductance, $C_{GD}R_0$ is a constant for unit of area $(A_C/A_R)$. $A_C$ is the area associated with the capacitance and is given by:

$$C_{GD}=\frac{\epsilon\epsilon_0 A_C}{L} \quad (2)$$

where L is the length and $\epsilon\epsilon_0$ are as defined previously herein. $A_R$ is the area associated with the resistance and is given by:

$$R_0=\rho\frac{L}{A_R} \quad (3)$$

Substituting Equations 2 and 3 into Equation 1 yields:

$$f_{max}=\frac{1}{2\pi\epsilon\epsilon_0\rho}\left(\frac{A_R}{A_C}\right) \quad (4)$$

Ideally, $A_R=A_C$. However, this is not possible in practical designs and $A_C$ is usually larger than $A_R$. Hence, for a given resistivity the ratio $(A_R/A_C)$ will then determine the reduction in frequency response. As a typical example wherein $\rho=2\Omega$ cm., $f_{max}=80$ $(A_R/A_C)$ gc. and it was experimentally found that $A_C/A_R=265$, and hence $$f_{max}=300 \text{ mc.}$$

The consequence of Equation 4 above is the conclusion that for a given geometry, the frequency response is independent of the current carrying area $A_C$ or $A_R$. Since the maximum power of the device $$P_{max}=V_{max}I_{D\,max}=\frac{V_{max}V_P}{4R_0} \quad (5)$$

with $$R_0=\frac{\rho L}{A_R}$$

we obtain $$P_{max}=\left(\frac{V_{max}V_P}{4\rho L}\right)A_R \quad (6)$$

This equation indicates a direct relation between the maximum power output to the area $A_R$ and/or $A_C$, since the ratio is assumed to be constant for a particular geometric design. Hence, without impairing the frequency response of the device, Equations 4 and 6 above predict theoretically an unlimited power output by increasing the area of the device. In a typical embodiment the maximum power of .2 watts has been obtained which is a power density $$P_{max}/A_C=320 \text{ watts/cm.}^2$$

and implies an area of 10 x 10 square mils=6.25 x $10^{-4}$ cm.$^2$. To achieve 1 watt would require an increase of area by a factor of 5. Thus, the multi-channel field-effect transistor device of the invention has electrically unlimited power capabilities for a given geometric design.

What is claimed is:

1. A field-effect triode device comprising:
(a) a body of semi-insulator material of a first conductivity-type;
(b) a control electrode member in the form of a grid of semi-insulator material of a second type of conductivity opposite to said first type disposed within and surrounded on all surfaces by said body of semi-insulator material;
(c) electrically conductive electrode members disposed on opposite surfaces of said body of semi-insulator material and in electrical contact therewith;
(d) a first region of semi-insulator material of said second type of conductivity extending into said body and surrounding said control electrode member while being electrically isolated therefrom by portions of said body;
(e) and a second region of semi-insulator material of said second type of conductivity extending into said body from a surface thereof and making electrical contact to said control electrode member while being electrically isolated from said first region by portions of said body.

2. The invention according to claim 1 wherein said electrically conductive electrode members are metallic layers disposed on opposite surfaces of said body of semi-insulator material.

3. A field-effect triode device comprising:
(a) a body of semi-insulator material of a first conductivity-type;
(b) a control electrode member in the form of a grid of semi-insulator material of opposite conductivity-type to that of said body of semi-insulator material disposed within and surrounded on all surfaces by said body of semi-insulator material;
(c) electrically conductive source and drain electrode members disposed on opposite surfaces of said body of semi-insulator material and in electrical contact therewith;
(d) a first region of semi-insulator material of said opposite conductivity-type extending into said body from the surface thereof on which said drain electrode is disposed and surrounding said control electrode member while being electrically isolated therefrom by portions of said body;
(e) and a second region of semi-insulator material of said opposite conductivity-type extending into said body from the surface thereof on which said drain electrode is disposed and making electrical contact to said control electrode member while being electrically isolated from said drain electrode and said first region by portions of said body.

4. The invention according to claim 3 wherein said source and drain electrode members are provided by high conductivity surface portions of said semi-insulator body.

5. A field-effect triode device comprising:
(a) a pair of outer electrically conductive members;
(b) a body of N-type semi-insulator material disposed between and in electrical contact with said pair of outer conductive members;
(c) an inner control electrode member in the form of a grid of P-type semi-insulator material disposed within and surrounded on all surfaces by said body of N-type semi-insulator material;
(d) a first region of P-type semi-insulator material extending into said body and surrounding said control electrode member while being electrically isolated therefrom by N-type portions of said body;
(e) and a second region of P-type semi-insulator material extending into said body from a surface thereof and making electrical contact to said inner control electrode member while being electrically isolated from said first region by N-type portions of said body.

6. A field-effect triode device comprising:
(a) a pair of outer electrically conductive members;
(b) a body of N-type semi-insulator material disposed between and in electrical contact with said pair of outer conductive members;
(c) an inner control electrode member in the form of a grid of P-type semi-insulator material disposed within and surrounded on all surfaces by said body of N-type semi-insulator material;
(d) a first region of P-type semi-insulator material extending into said body and surrounding said P-type control grid while being electrically isolated therefrom by N-type portions of said body;
(e) and a second region of P-type semi-insulator material extending into said body from a surface thereof through one of said outer electrically conductive members and making electrical contact to said P-type control grid while being electrically isolated from said first region and said one of said outer electrically conductive members by N-type portions of said body.

7. A field-effect triode device comprising:
(a) a body of N-type semi-insulator material having a predetermined resistivity;
(b) a first region of N-type semi-insulator material disposed on and in electrical contact with a first surface of and integral with said body of N-type semi-insulator material but of lower resistivity than said predetermined resistivity;
(c) a second region of N-type semi-insulator material disposed on a second surface of and integral with said body of N-type semi-insulator material and of lower resistivity than said predetermined resisitvity;
(d) an internal region of said semi-insulator body being disposed between said first and second regions of said semi-insulator body and in the form of a grid of P-type semi-insulator material within said semi-insulator body and surrounded on all surfaces thereby;
(e) a region of P-type semi-insulator material extending into said body and surrounding said internal region thereof while being electrically isolated therefrom by N-type portions of said body;
(f) and electrical connections to said internal P-type grid region and to said first and second N-type regions.

8. a field-effect triode device comprising:
(a) a body of semi-insulator material having a first type of conductivity;
(b) a source electrode member disposed on and in electrical contact with a first surface of said body;
(c) a drain electrode member disposed on and in electrical contact with a second surface of said body opposite said first surface thereof;
(d) a grid electrode member of semi-insulator material of a second type of conductivity disposed within and surrounded on all surfaces by said body of semi-insulator material;
(e) a ring of semi-insulator material having second type of conductivity disposed within said body of semi-insulator material and surrounding said grid electrode member while being electrically isolated therefrom by portions of said body;

(f) and a grid electrode contact region of semi-insulator material having said second type of conductivity extending from said second surface of said body through said drain electrode member and making electrical contact to said grid electrode member while being electrically isolated therefrom and said ring of semi-insulator material by portions of said body.

9. A field-effect triode device comprising:

(a) a body of semi-insulator material having a first type of conductivity;

(b) a source electrode member disposed on and in electrical contact with a first surface of said body;

(c) a drain electrode member disposed on and in electrical contact with a second surface of said body opposite said first surface thereof;

(d) a grid electrode member of semi-insulator material of a second type of conductivity disposed within and surrounded on all surfaces by said body of semi-insulator material;

(e) a ring of semi-insulator material having said second type of conductivity disposed within said body of semi-insulator material having a gap therein so as to substantially surround all but a predetermined portion of said grid electrode member while being electrically isolated therefrom by portions of said body;

(f) and a grid electrode contact region of semi-insulator material having said second type of conductivity extending from said second surface of said body through said gap in said ring of semi-insulator material and making electrical contact to said grid electrode member while being electrically isolated therefrom and said ring of semi-insulator by portions of said body.

10. A field-effect triode device comprising:

(a) a body of semi-insulator material having a first type of conductivity and of predetermined resistivity;

(b) a first layer of semi-insulator material disposed on a first surface of and integral with said body of semi-insulator material, said first layer being of said first type of conductivity and of lower resistivity than said predetermined resistivity;

(c) a second layer of semi-insulator material disposed on a second surface of and integral with said body of semi-insulator material, said second layer being of said first type of conductivity and of lower resistivity than said predetermined resistivity;

(d) an internal region of said semi-insulator body being disposed between said first and second layers and in the form of a grid of semi-insulator material of a second type of conductivity opposite to said first type;

(e) a region of said semi-insulator body having said second type of conductivity extending into said semi-insulator body and surrounding said internal region thereof while being electrically isolated therefrom by portions of said body;

(f) and a second region having said second type of conductivity provided in said body so as to extend thereinto from a surface thereof and make electrical contact to said internal region thereof while being electrically isolated from said first named region by portions of said body.

References Cited

UNITED STATES PATENTS

| | | | |
|---|---|---|---|
| 2,790,037 | 4/1957 | Shockley | 179—171 |
| 2,899,344 | 8/1959 | Atalla et al. | 148—1.5 |
| 2,968,750 | 1/1961 | Noyce | 317—235 |
| 2,989,713 | 6/1961 | Warner | 338—20 |
| 3,025,438 | 3/1962 | Wegener | 317—235 |
| 3,258,663 | 6/1966 | Weimer | 317—235 |
| 3,260,902 | 7/1966 | Porter | 317—235 |
| 3,268,374 | 8/1966 | Anderson | 148—175 |
| 3,274,461 | 9/1966 | Teszner | 317—235 |
| 3,275,911 | 9/1966 | Onodera | 317—235 |
| 3,035,186 | 5/1962 | Doucette | 307—88.5 |
| 3,176,192 | 3/1965 | Suer et al. | 317—101 |
| 3,252,003 | 5/1966 | Schmidt | 307—88.5 |

FOREIGN PATENTS

| | | |
|---|---|---|
| 1,324,048 | 3/1963 | France. |

JOHN W. HUCKERT, *Primary Examiner.*

R. F. SANDLER, *Assistant Examiner.*